J. W. Elliott,
Sharpening Reciprocating Saws.
N° 23,835. Patented May 3, 1859.
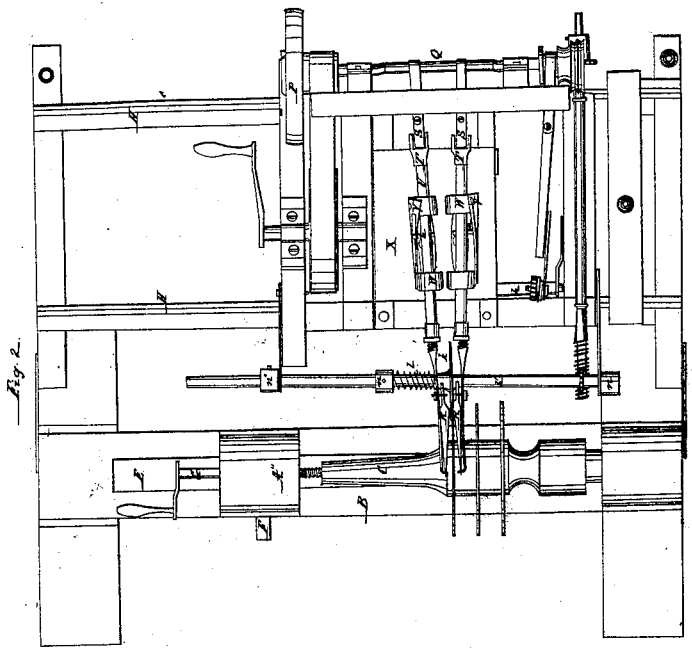
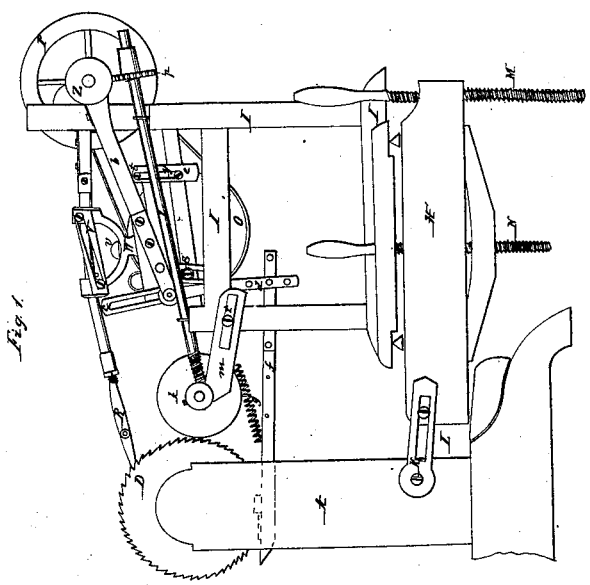
Witnesses:
Daniel Breed
Edw. F. Brown
Inventor
James W. Elliott

UNITED STATES PATENT OFFICE.

JAMES W. ELLIOTT, OF PRATTVILLE, ALABAMA.

MACHINE FOR FILING GIN-SAWS.

Specification of Letters Patent No. 23,835, dated May 3, 1859.

*To all whom it may concern:*

Be it known that I, JAMES W. ELLIOTT, of Prattville, in the county of Autauga and State of Alabama, have invented a new and Improved Machine for Filing Gin-Saws on Cylinders; and I do hereby declare that the following is a full and exact description thereof, reference being had to the accompanying drawings and to the letters of reference marked thereon.

With the filing machines now in use for filing cotton gin saws, it is difficult to accurately adjust the files to saws of different sizes, and properly to revolve the saws as the filing progresses.

My invention consists in certain improvements for remedying these defects and for otherwise facilitating the filing of gin saws upon a cylinder.

In the accompanying drawings, Figure 1 is an end view of my machine. Fig. 2 is a top view of the same.

The standard A, and bar B are intended for supporting the cylinder of saws D, and the saw shaft C, while the saws are being filed. One post, A', of the standard A, is adjustable, from right to left, in the slot E, of bar B. A key F is employed to fix the movable post at any desired point, to fit the length of the saw shaft C. A crank screw G, fastens one end of the saw shaft while the other is held by a barb in the fixed or main post of the frame A. By the use of this frame the cylinder of saws may be taken from the cotton gin and brought to a convenient and light place, instead of carrying the filing machine to the gin, or moving the whole gin, as is often done.

Placed beside the standard A, and of a corresponding length, is a way H, upon which the frame I may slide to and fro in order to bring the files in working position in regard to the saw which is to be filed. This way H is connected with the standard A by an adjusting link K, which allows the way to be placed nearer or more distant from the standard at pleasure. The link K is fixed, by means of a thumb screw L. One end of the cross bar H' of way H, rests on the pedestal of standard A, while the other end of said cross bar is supported by a screw foot M, by means of which the way H may receive any desired inclination, in order to bring the files in proper relative position to saws of different sizes. The frame I, has grooves, in the lower cross bar, to fit the way H, in sliding back and forth, and the frame is fixed in place by a clamp screw N. This frame I supports the whole machinery for operating the files and turning the saws as they are filed.

The driving wheel O, gives motion, by means of band and pulley, to the balance wheel P, and crank shaft Q. The crank shaft Q, operates the pitmen S, file holders U, and files R. The file holders U are made very thin near the attachment of the files, so as to give some spring to the holder. The pitmen S are connected with the holders U by a swivel joint T, so that the holders U may revolve upon their own axes. These holders U slide to and fro in guides W, and as they move back and forth, they receive a spiral motion from pins $a$, which slide in a spiral slot in plate V, connected with guides W. The feet of guides W rest upon a table X, and are fastened by screws $v$. By means of screws $v$, the guides W, can be adjusted so as to set the files at any desired angle, or to make them bear against the saw with more or less force, as is necessary with different saws. The table X, is hinged at $x$, so as to be set at any desired angle by means of thumb screws $s$, and adjusting plate $r$. The hinge of the table X may also be elevated or depressed at pleasure by means of the adjusting plate $y$, and thumb screw $e$. By these arrangements the files can be adjusted so as to operate with great accuracy in almost any desired direction, according to the size and position of the saws.

The connecting rod $b$ is attached to the crank shaft 2, upon an eccentric or crank which, as the shaft 2 revolves, gives motion to the arm $c$, the rock-shaft $h$, the arm $d$, and to the pawl $f$. This pawl $f$, is held against the saw teeth by a coiled spring $g$, and rotates the saw as the filing progresses.

The small wheel Z has a screw thread cut upon its periphery. This screw thread engages with the cogs of wheel $p$, giving motion to shaft $i$, which in turn gives motion to shaft $h'$ by means of another screw thread and cog wheel. This shaft $h'$ carries a pair of friction plates $k$, one of which is movable on the shaft $i$, and is held in place by a coiled spring $l$. These friction plates are intended to clamp the saw, as seen in Fig. 2, holding it steady during the filing, and at the same time, as the shaft $h'$ is rotated by shaft $i$, these plates gently rotate the saw, coöperating with the pawl $f$. The shaft $h'$ is adjustable by the slotted plate $m$, and thumb screw $t$, and also by means of the stops $n$, $n'$ and $n''$, which are provided with a small set screw to fix them in place.

The chief advantage of my machine over other machines of similar construction are: 1st. The heel or hinge of the table X is adjustable, so as to give the files the exact direction desired, according to the size and position of the saw. 2nd. My cylinder frame or standard A is adapted to cylinders of different lengths, and it can be much more readily adjusted than any other cylinder frame in use. 3rd. By means of feet M and links K the frame I and the files are easily adjusted to saws of very different sizes. 4th. The pawl $f$, gives a definite and positive motion to the saw, so that the file will always come to the proper bearing between the teeth.

I am aware that machines, having a general construction similar to mine, are in common use, but I believe that my machine is a great improvement over any other filing machine hitherto known.

I am aware that adjusting screws for beveling instruments are not new. Therefore I do not claim such devices; neither do I claim any of the separate mechanical devices used in my machine; but I believe that I have made a substantial improvement in machines for filing cotton gin saws on a cylinder, to which machines all my claims are confined.

Having thus fully described my invention, what I claim and desire to secure by Letters Patent of the United States is:

1. I do not claim making the table X, adjustable at one end only, but I claim making said table adjustable at both ends substantially as set forth.

2. I claim the standard A with the adjustable post A' and slotted bar B for supporting the cylinder of saws, substantially as described.

3. I claim making the way H adjustable, both perpendicularly and laterally for bringing the frame I, to any desired position substantially as described.

4. I claim the use of the clamp screw N, in combination with the way H, for holding the frame I in position, as set forth.

5. I claim the pawl $f$, held in place by the coiled spring $g$, and operated by the connecting rod $b$, rock shaft $h$, and levers or arms $c$, and $d$, for rotating the saw, substantially as set forth.

6. I claim the friction plates $k$ for holding and moving the saws, said plates being arranged and operated substantially as described.

7. I claim the adjustability of the guides W for the purpose of pressing the files more or less against the saws at pleasure as set forth.

JAMES W. ELLIOTT.

Witnesses:
 DANIEL BREED,
 EDM. F. BROWN.